United States Patent Office 3,530,557
Patented Sept. 29, 1970

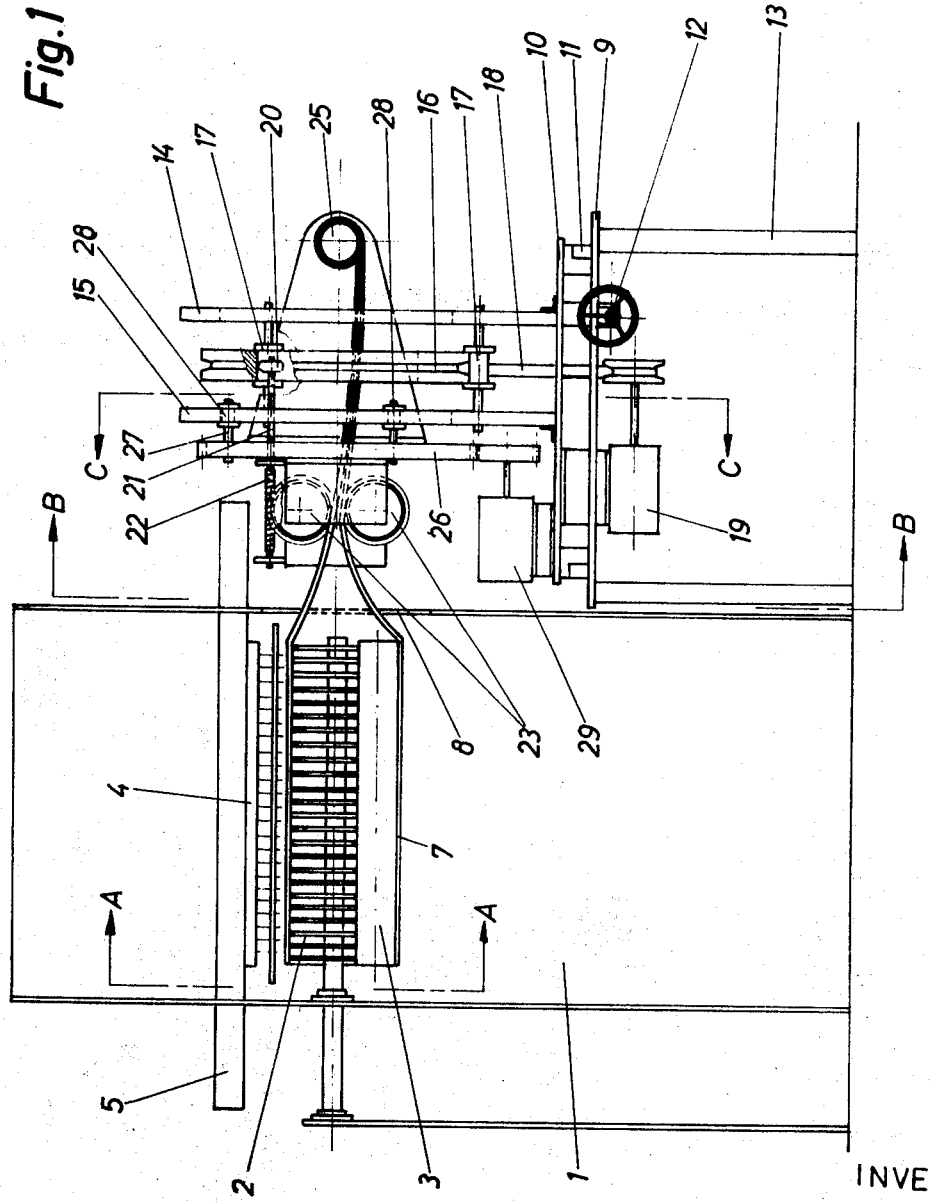

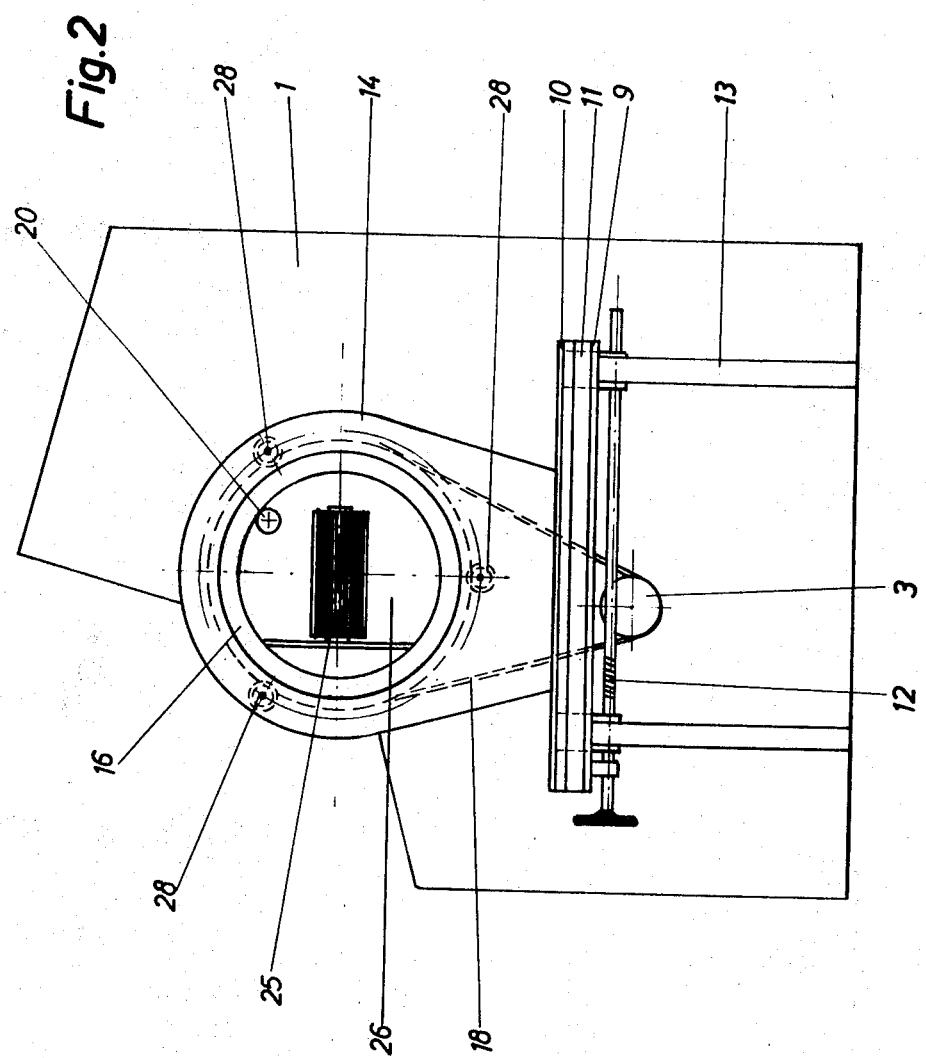

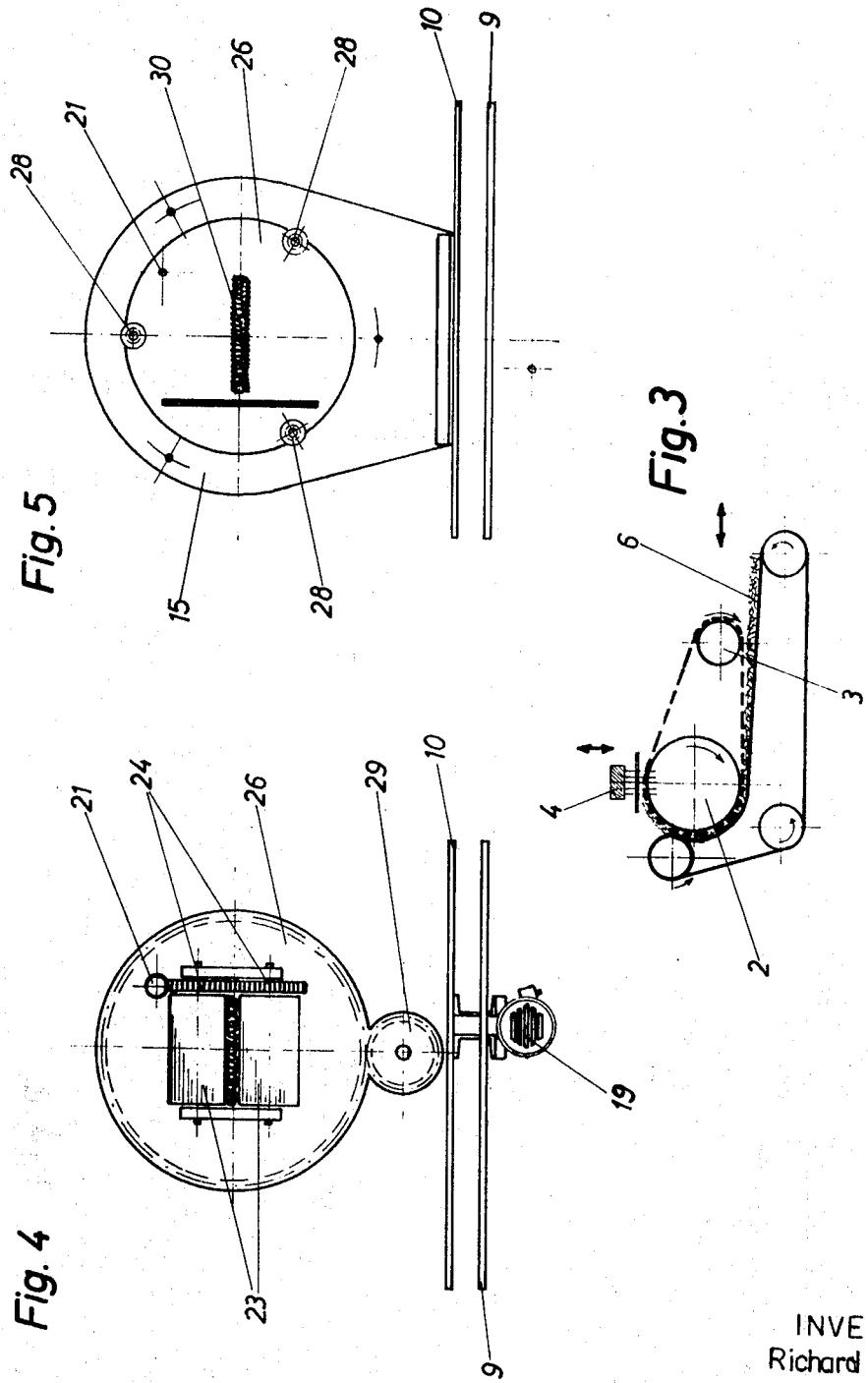

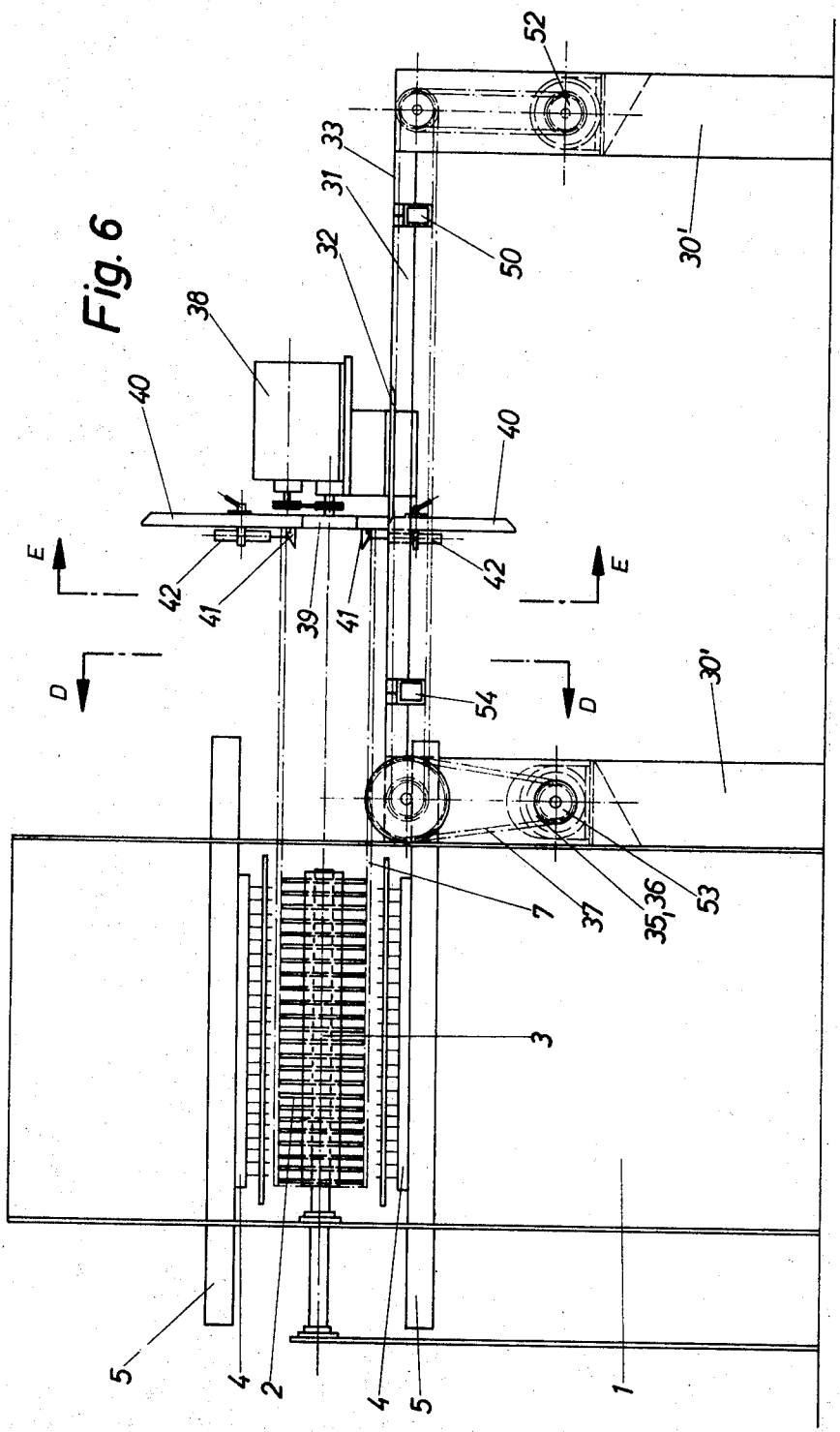

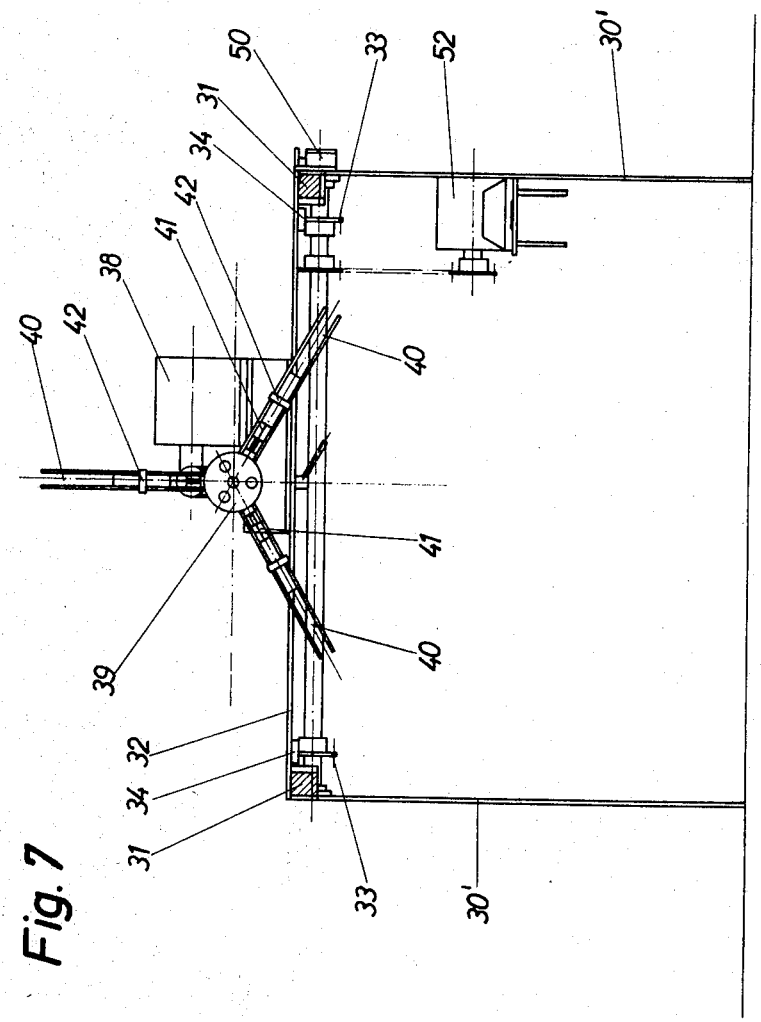

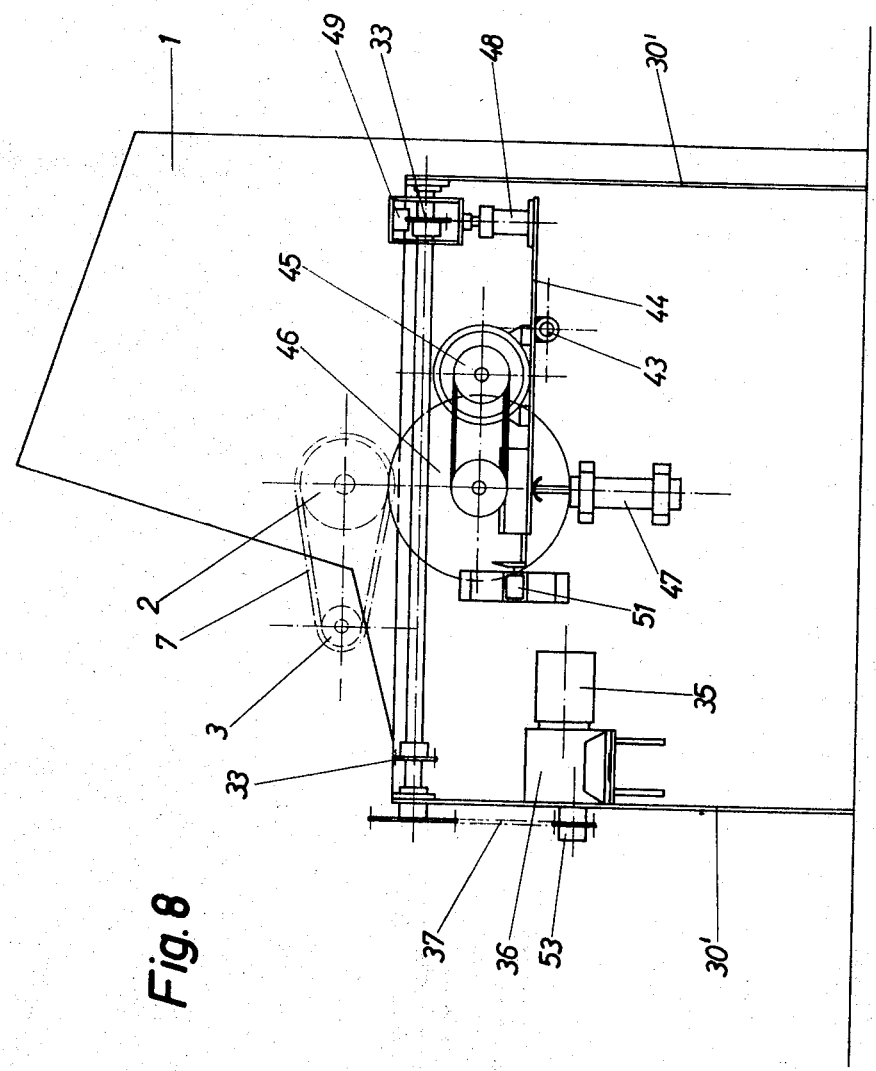

3,530,557
APPARATUS FOR MAKING NON-WOVEN
FIBROUS TUBING
Richard Dilo, Eberbach (Neckar), Germany, assignor to
Firma Oskar Dilo KG, Eberbach (Neckar), Germany
Filed July 1, 1968, Ser. No. 741,492
Claims priority, application Germany, July 4, 1967,
D 53,511
Int. Cl. D04h 18/00
U.S. Cl. 28—4                                    12 Claims

ABSTRACT OF THE DISCLOSURE

A continuous fabric tubing is prepared by helically winding non-woven webs on a rotating drum in partly overlapping relationship, stitching the partly superimposed turns to each other by needling, and axially pulling the tubing so formed from the drum. The take-up mechanism, which pulls the tubing from the drum, rotates with the drum, and an automatic cut-off mechanism may be provided for automatically cutting the continuous tubing to uniform, adjustable lengths. The tubing may consist entirely of monofilaments and other smooth fibers not capable of normal felting.

BACKGROUND OF THE INVENTION

This invention relates to non-woven textiles, and particularly to tubing essentially consisting of helically wound turns of a non-woven fibrous web, to a method of producing such tubing, and to an apparatus for performing the method.

Sleeves of felt and similar non-woven textile material find many applications in industry, such as surface layers on rollers in processing equipment and the like. The range of fibrous materials capable of being converted into felts having the necessary mechanical strength is quite narrow because smooth fibers do not engage each other with sufficient friction to provide a felt made therefrom with adequate cohesive strength. The fibers which are converted to felts by fulling or other conventional methods must contain a sizable percentage of wool for adequate strength of the tubing to be prepared therefrom. Wool, however, is sensitive to acid and particularly to alkali, and quickly deteriorates when used with these and many other chemicals.

An object of the invention is the provision of non-woven textile tubing whose mechanical strength does not depend on a specific configuration of the fibers employed, and is thus capable of being prepared from synthetic fibers of all types including monofilaments, and from inorganic fibers which may have completely smooth surfaces.

Concomitant objects of the invention are a method of producing such non-woven tubing, and apparatus for performing the method.

SUMMARY OF THE INVENTION

In one of its aspects, the invention therefore resides mainly in tubing essentially consisting of a plurality of helically wound, coaxial turns of at least one fibrous web of non-woven fabric, each turn overlapping at least one preceding turn and being overlapped by at least one succeeding turn. A plurality of fibers integral with each other extend radially from that turn inward through at least one subjacent turn, the turns being fastened to each other by the radially extending fibers.

In the method of making continuous tubing of the aforedescribed type, at least one non-woven fibrous web is wound in a plurality of coaxial helical turns at such a helix angle that each turn axially overlaps at least one preceding turn and is itself overlapped by at least one succeeding turn. A multiplicity of needles is passed inwardly through the overlapping turns until fibers from an outer turn are drawn inwardly through at least one subjacent turn, whereby the turns are fastened to each other. The needles are then withdrawn from the tubing so formed in an outward direction.

The web may be fed continuously to a drum member in a tangential direction while the drum member rotates about its axis, and the turns so formed are axially drawn from the drum. The turns are fastened to each other by the afore-mentioned needles while supported on the drum.

More specifically, the apparatus employed may mainly consist of a drum arrangement which tapers in the direction of its axis of rotation, a feeding mechanism for continuously feeding a web of non-woven material to an axial portion of the drum arrangement in a direction substantially tangential relative to the axis of rotation, a needling mechanism for needle stitching consecutive turns of the web wound on the drum arrangement and a take-up mechanism for axially moving the turns on the drum arrangement. By the simultaneous rotation of the drum arrangement and the axial motion imparted by the take-up mechanism, the turns of web material form a helix of partly radially superimposed turns when the velocity of axial movement does not exceed a predetermined velocity. The several turns are thus stitched to each other in the form of continuous tubing, and the tubing is drawing from the drum arrangement by the take-up mechanism.

Other features, additional objects and many of the attendant advantages of this invention will readily be understood by reference to the following detailed description of a preferred embodiment when considered in connection with the attached drawing.

BRIEF DESCRIPTION OF THE DRAWING

In the drawing:

FIG. 1 shows an apparatus of the invention for the continuous production of non-woven textile tubing in side elevation;

FIG. 2 shows the apparatus of FIG. 1 in front elevation;

FIGS. 3 to 5 show the apparatus of FIG. 1 in sections on the line A—A, B—B and C—C, respectively;

FIG. 6 illustrates a modified apparatus of the invention in side elevation;

FIGS. 7 and 8 show the apparatus of FIG. 6 in sections on the lines E—E and D—D, respectively.

DESCRIPTION OF THE PREFERRED EMBODIMENTS

Referring now to the drawing in detail, and initially to FIGS. 1 and 2, there is seen a machine frame 1 which supports an elongated drum 2 of circular cross section. The drum 2 tapers slightly from the left toward the right, as viewed in FIG. 1, and has a multiplicity of circumferential grooves. For the sake of convenient pictorial representation, relatively few grooves have been shown in FIG. 1, and their axial width has been exaggerated. The drum 2 is mounted on a shaft which is driven at a constant speed by a non-illustrated electric motor, whenever the machine operates.

A thin cylindrical roller 3 is journaled in a non-illustrated bearing on the frame 1 below the drum 2, and the bearing is adjustable on the frame to vary the axial spacing of the drum 2 and the roller 3, the respective axes being parallel.

A plate 4 carrying a multiplicity of needles is mounted above the drum 2 on a carrier 5. The carrier is vertically slidable on the frame 1 and is reciprocated by the drive motor of the drum 2 so that the needles on the plate 4 are inserted into the grooves of the drum 2 and withdrawn at a speed which can be adjusted by a variable transmission, not shown, which is interposed between the non-illustrated drive motor and the carrier 5.

As is seen in FIG. 3, a narrow fibrous web 6 of non-woven fabric is fed by an endless conveyor to the drum 2 and the roller 3, and is initially wound in a continuous loop over the drum and the roller. The several layers of fibrous material superimposed during the joint rotation of the drum and the roller, the latter being turned by the fibrous material, are continuously interwoven by the reciprocating needles on the board 4 in a manner conventional in the manufacture of non-woven fabrics. When the starting loop reaches the desired thickness, it is pulled manually along the drum 2 from the wide toward the narrow axial end at a rate to maintain the desired thickness in the multilayered, helically wound tube 7 of needled non-woven fabric which is thereafter produced. The end of the tube is ultimately drawn from the drum 2 and pulled through an opening 8 in the frame 1 to a take-up mechanism which thereafter collects the tubular material at a rate to provide the desired overlapping of sequential turns of the web 6.

The take-up mechanism is mounted on a carriage 10 which travels on rails 11 on the table 9, a spindle 12 equipped with a handwheel being journaled in the table 9 and engaging a threaded sleeve on the carriage 10 to move the carriage horizontally at right angles to the axis of the drum 2. The table 9 is mounted on legs 13 which are hydraulic cylinders containing pistons attached to the table 9, but not visible in the retracted position shown in the drawing. The take-up mechanism may thus be shifted in two directions to accommodate tubes 7 of different width, as determined by the radial spacing of the drum 2 and of the roller 3.

Two annular upright plates 14, 15 are mounted on the carriage 10 in such a manner that the axes of their openings coincide and are parallel to the axis of the drum 2. A flat annular pulley 16 is supported between the plates 14, 15 on rollers 17 which engage the outer circumference of the pulley and whose shafts connect the plates 14, 15. A V-belt 18 is trained over the pulley 16 and over the drive pulley of a variable-speed electric motor 19 mounted on the frame 1.

A friction roller 20 engages the inner circumference of the pulley 16, and drives a shaft 21 which passes freely through the central openings in the plate 15. The shaft 21 carries a worm 22 which meshes with a gear 24 on one of two take-up rolls 23 drivingly connected by the gears 24.

During operation of the illustrated apparatus, the tube 7 is flattened and pulled through the opening 8 in the frame 1 by the take-up rolls 24. It is stored on a wind-up reel 25 driven by its own non-illustrated electric motor equipped with a slip clutch to maintain the necessary slight tension in the flattened tube.

The tube 7 rotates about its axis as it is discharged from the drum 2 and roller 3, and the entire take-up mechanism turns with it. A spur gear 26 is rotatably mounted on the plate 15 by means of circumferentially distributed stub shafts 27 on the gear 26, which carry V-notched rollers 28. The rollers 28 travel on the rim of the plate 15 around the central opening of the plate so that the gear 26 rotates coaxially with the pulley 16. The gear 26 is driven by a pinion on the output shaft of a variable-speed electric motor 29 at the same speed as the drum 2. As is best seen in FIG. 5, the flattened tube 7 passes through a diametrical slot 30 in the gear 26.

The afore-mentioned shaft 21, which connects the worm 22 to the friction roller 20, is journaled in the gear 26. The take-up rollers 24, the wind-up reel 25, and the non-illustrated drive motor of the latter are mounted on a sheet metal bracket fixedly attached to the gear 26 and extending through the central openings in the plates 14, 15.

Typically, the drum 2 and the roller 3 in the apparatus shown in FIGS. 1 to 5 may be set to produce helically wound, needle-stitched, non-woven fabric tubing 4 to 12 cm. in diameter. The needle plate 4 may carry about 1300 needles arranged in 13 rows extending axially of the drum 2, one needle of each row being aligned with a groove in the drum 2 and with one row of needles passing through the center line of the drum in a radial direction while the other rows are spaced from the center line in parallel planes. Depending on the requirements, the needle plate carrier 5 may be reciprocated approximately 100 to 1000 times per minute. The thickness of the tube 7 depends on the characteristics of the web 6 and on the pitch of the helix in which the web is wound over the drum 2 and the roller 3. The helix pitch is determined by the rotary speed of the take-up roll 24 at fixed rotary speed of the drum 2, and thus by the relationship of the speeds of the motors 19 and 29 which can be adjusted in a non-illustrated conventional manner.

The tubing produced on the afore-described apparatus is being used successfully as a surface cover on cylindrical rollers employed in the paper industry and on tannery equipment. It can also be used as a filter medium on drum filters and, generally, where felt sleeves are presently used.

Conventional felt sleeves are prepared from woven fabrics or by fulling. In order to possess the required mechanical strength, they must contain an adequate amount of wool and have, therefore, limited resistance to acids, and particularly to alkaline liquids. The apparatus described above produces strong tubing from all types of fibers including smooth fibers which cannot be felted by fulling or other conventional methods. I have successfully prepared felt-like tubes from all commonly available synthetic fibers, but also from inorganic fibers, such as metal, glass and asbestos fibers, without the admixture of wool. All conventional textile materials, including wool, can of course be converted to tubing on the illustrated apparatus.

When the tubing made according to this invention includes thermoplastic fibers, such as fibers of polyesters, polyamides, polypropylene, or acrylics, they may be subjected to a thermal aftertreatment. Typically, they may be subjected to infrared radiation from the outside or the inside to soften and fuse as much of the fibrous material as is desired. Depending on the readily controlled input of thermal energy, the tubing may be converted to a continuous, homogeneous structure, to an otherwise continuous film tube having pores of controlled size, or to a material of recognizable fiber structure in which the fibers are partly bonded to each other by heat sealing.

Bonding of the fibers to each other with or without thermal sealing may also be achieved by conventional admixtures to the initial web 6, such as elastomers (natural or synthetic rubber), and thermoplastic resins or thermosettings resins in the uncured condition, particularly phenol-formaldehyde and amine-formaldehyde resins, and by subsequently setting the adhesive. Other bonding materials suitable for use in preparing webs 6 include starch, starch ethers or esters, glues and adhesives of animal or plant origin (alginates, caseinates), also cellulose derivatives (cellulose esters, cellulose ethers, viscose) and vinyl alcohol.

Adhesives or bonding agents which have been used with particular success on the illustrated apparatus include a latex of butadiene-styrene elastomer, a latex of butadiene-acrylonitrile copolymer, and natural rubber latex. These bonding agents are set by heating the tube 7 until the water is substantially completely evaporated. The configuration of the pores in the non-woven fabric tube so obtained can be controlled precisely and reproducibly by selecting the setting conditions. The bonding agent, while still fluid, tends to migrate toward the source of heat, and the pores thus are smaller on the side of the tubing from which the heat is applied. The performance of filtering media of the invention can be improved by controlling the direction in which the flow section of the medium decreases.

Other bonding agents which have been successfully in webs 6 fed to the apparatus of FIGS. 1 to 5 are aqueous dispersions of plasticized vinyl ester polymers, such as polymers and copolymers of vinyl acetate and vinyl chloride.

The modified apparatus shown in FIGS. 6 to 8 operates in substantially the same manner as that described hereinabove to produce corresponding products from non-woven webs with or without bonding agents.

Referring initially to FIG. 6, there is seen a frame 1, a drum 2, and a roller 3, identical with the corresponding elements shown in FIG. 1, and two needle-studded plates 4 on respective carriers 5 which move radially toward and away from the drum 2 in opposite directions for needle-stitching a tube 7 formed on the drum in the general manner described above with reference to FIGS. 1 to 5. The modified apparatus is capable of producing tubing 7 of a diameter selected by varying the spacing of the drum 2 and of the roller 3.

The take-up mechanism best seen in FIGS. 6 and 7 is mounted on a support 30' by means of rails 31 elongated axially of the drum 2 and a carrier plate 32 longitudinally guided on the rails 31. The plate 32 is moved by continuous drive chains 33 attached to lateral lugs 34 of the plate. The chains are trained over sprockets of which one is driven by an electric motor 35 equipped with an infinitely adjustable variable-speed transmission 36, and connected to the driven sprocket by an overriding clutch 53, pulleys and a belt 37.

An electric motor 38 is mounted on the plate 32 for turning the hub 39 of a tube gripping mechanism about the axis of the drum 2 through a variable speed transmission which permits the rotary speed of the hub 39 to be adjusted to the rotary speed at which the drum 2 is turned by its non-illustrated drive motor.

Three pairs of guide channels 40 equiangularly radiate from the hub 39. The opposite grooves of each pair hold a pneumatically operated clamping mechanism in a radially adjustable position. Each mechanism consists of a cylinder 42 carrying an anvil 41 in radially inwardly spaced relationship, and a spring-loaded plunger in the cylinder 42 which moves toward and away from the anvil 41 when the cylinder 42 is supplied with operating fluid from a compressed air line and vented through a solenoid valve in a conventional manner, not explicitly illustrated in the drawing.

The modified apparatus also is equipped with a cut-off mechanism which has been emitted for the sake of clarity from FIG. 6, where it would be largely obscured by the motor 35, and associated elements of the drive mechanism for the chains 33, but is shown in FIG. 8. The cutting mechanism is mounted on the frame 1 by means of a shaft 43 and a rocker plate 44 movable on the shaft 43. The portion of the rocker plate to the left of the shaft 43, as viewed in FIG. 8, carries an electric motor 45 connected by a belt drive to a circular cutting blade 46 mounted on the rocker plate 44 to the left of the motor. A pneumatically operated jack 47 is attached to the frame 1 under the portion of the plate 44 which carries the shaft of the blade 46. Another pneumatically operated jack 48 attached to the plate 44 carries a coupling clamp 49 which permits the plate 44 to be coupled to one of the drive chains 33 for axial movement thereby on the shaft 43.

The apparatus shown in FIGS. 6 to 8 automatically produces cut lengths of non-woven fabric tubing in the following manner:

At the start of each operating cycle, the carrier plate 32 is located at the left end of the support 30', as viewed in FIG. 6, and the leading circular edge of the tube 7 is located between the anvils 41 and the retracted plungers of the clamping mechanisms. As the plungers are expelled from the cylinders 42 by compressed air, they clamp the tube 7 to the take-up mechanism while the hub 39 turns in unison with the drum 2 and the roller 3. The carrier plate 32 is moved toward the right by the chains 33 at a rate which determines the helix angle of the web which is being wound on the drum 2 and the cylinder 3 while the several layers of the tube 7 formed thereby are stitched to each other by the needles on the needle plates 4.

The carrier plate 32 is moved toward the right until it abuts against a limit switch 50 which may be shifted on the support 30 according to the length of the tubing pieces which it is desired to produce. The switch 50 controls admission of compressed air to the jack 47 through a non-illustrated solenoid valve which also provides air for the coupling jack 48. The rocker plate 44 is tilted clockwise, as viewed in FIG. 8, so that the rotating blade 46 cuts the tube 7 while the plate 44 is moved by the chains 33 on the shaft 43 in unison with the take-up mechanism. The front end of the tube 7 is severed from the remainder of the tube after one revolution of the hub 39, and upward pivoting of the plate 44 by jack 47 and drops from the machine when the rocker plate 44 hits another limit switch 51 on the frame 1, which shifts the afore-mentioned non-illustrated solenoid switch to vent the jacks 47, 48 and energizes another motor 52 connect to sprockets for the chains 31.

A non-illustrated return spring moves the rocker plate 44 on the shaft 43 into its starting position, and the motor 52 shifts the carrier plate 32 toward the left, as viewed in FIG. 6, until the clamping mechanism 41, 42 grasps the freshly cut leading edge of the tube 7, and a new operating cycle is started by abutting engagement of the carrier plate 32 with yet another limit switch 54 on the frame 1. The switch 54 deenergizes the motor 52 and actuates the clamping mechanisms 41, 42. The latter are released by a non-illustrated solenoid valve when the limit switch 50 is operated. The overriding clutch 53 permits the carrier plate 32 to be returned to its starting position by the motor 52 while the motor 35 is energized.

The relays which connect the limit switches 50, 51, 54 with the pneumatic circuit of the machine and with the associated electric motors, and the pneumatic circuit itself have not been shown since they are conventional and obvious to those skilled in the art from the above description of their mode of operation.

The tubing 7 produced on the apparatus shown in FIGS. 6 to 8 is indistinguishable from that made on the apparatus of FIGS. 1 to 5. As released from the illustrated machines, it consists essentially of a helically wound fibrous web, each helical turn axially overlapping at least one axially preceding turn and being itself overlapped by an axially succeeding turn, the several superimposed turns being connected by fibers of an outer web extending radially inwardly through the inner layers, as is inherent in the needling operation by which the several layers are firmly anchored to each other.

While it is preferred to equip the apparatus of the invention with an auxiliary roller 3 to permit the diameter of the tubing to be changed as needed, the slightly tapering drum 2 alone is sufficient if long lengths of tubing of uniform diameter are to be made. It will further be appreciated that more than one web 6 may be fed simultaneously to the same drum 3 if so desired.

Other changes in the illustrated apparatus and in its mode of operation will readily suggest themselves to those skilled in the art, and the resulting changes in structural details of the tubing produced will be evident.

I claim:

1. A method of making continuous tubing from non-woven fabric which comprises:
   (a) winding at least one non-woven fibrous web in a plurality of coaxial helical turns at such a helix angle that each turn axially overlaps at least one preceding turn and is itself overlapped by at least one succeding turn;
   (b) passing a multiplicity of needles inwardly through the overlapping turns until fibers from an outer turn are drawn radially inwardly through at least one subjacent turn, whereby said turns are fastened to each other; and (c) withdrawing said needles in an outward direction.

2. A method as set forth in claim 1, wherein said web is wound in said turns by continuously feeding the web tangentially to a drum member having an axis and revolving about said axis, whereby turns of said web are formed on said drum member about said axis; and axially drawing said turns from said drum member.

3. A method as set forth in claim 2, wherein said turns are fastened to each other by said passing of needles while supported on said drum member.

4. Apparatus for making continuous tubing from non-woven fabric comprising, in combination:
 (a) drum means having an axis of rotation and tapering in an axial direction;
 (b) web feeding means for continuously feeding a web of fibrous non-woven material to an axial portion of said drum means in a direction substantially tangential relative to said axis,
  (1) whereby a plurality of consecutive turns of said web are partly superimposed on each other on said drum means during continuous rotation of the same;
 (c) needling means for needle stitching portions of said turns radially superimposed on said drum means to each other; and
 (d) take-up means for axially moving said turns on said drum means,
  (1) whereby said turns jointly form a helix, successive turns of said helix being radially partly superimposed when the velocity of axial movement of said turns does not exceed a predetermined velocity, and said turns are stitched to each other in the form of tubing by said needle means,
  (2) said tubing being axially drawn from said drum means by said take-up means.

5. Apparatus as set forth in claim 4, wherein said drum means include a drum member mounted for rotation about said axis and tapering in the direction of said axis, and a cylindrical member having an axis, said axes extending in a common direction, said drum member being formed with a plurality of axially spaced circumferential grooves, said needling means including a plurality of needles, and carrier means for moving said needles inwardly and outwardly of said grooves.

6. Apparatus as set forth in claim 4, wherein said take-up means include two take-up rolls arranged to receive said tubing therebetween under pressure, drive means for rotating at least one of said rolls and for thereby moving said turns axially on said drum means, and turning means for jointly turning said rolls substantially about said axis of rotation.

7. Apparatus as set forth in claim 6, wherein said turning means include a stationary support member, the drive means for rotating one of said rolls including a pulley member rotatably supported on said stationary support member, means for rotating said pulley member on said support member, a drive roller peripherally engaging said pulley member in rolling engagement, and motion transmitting means operatively interposed between said drive roller and said one take-up roll.

8. Apparatus as set forth in claim 7, further comprising a movable support member mounted for coaxial rotation with said pulley member, said drive roller and said take-up rolls being mounted on said movable support member, and motor means for rotating said movable support member coaxially with said pulley member.

9. Apparatus as set forth in claim 8, further comprising a wind-up reel rotatably mounted on said movable support member for winding said tubing.

10. Apparatus as set forth in claim 4, further comprising cut-off means responsive to the drawing of a predetermined length of tubing from said drum means for severing the drawn-off length of tubing from the remainder of said tubing on said drum means.

11. Apparatus as set forth in claim 10, said take-up means including a carrier, moving means for moving said carrier away from said drum means in the direction of said axis, and clamping means on said carrier for clampingly engaging said tubing.

12. Apparatus as set forth in claim 11, further comprising coupling means for coupling said cut-off means to said carrier for movement therewith during said severing.

References Cited

UNITED STATES PATENTS

| | | | |
|---|---|---|---|
| 2,941,911 | 6/1960 | Kumnick et al. | 156—86 |
| 3,013,921 | 12/1961 | Jacobson | 156—191 |
| 3,020,615 | 2/1962 | Peters | 138—129 |
| 3,117,359 | 1/1964 | O'Byrne | 28—4 |
| 3,166,823 | 1/1965 | Bernard | 28—72.2 |

LOUIS K. RIMRODT, Primary Examiner

U.S. Cl. X.R.

28—72.2